United States Patent [19]
Swick

[11] 3,899,886
[45] Aug. 19, 1975

[54] GAS TURBINE ENGINE CONTROL
[75] Inventor: Robert M. Swick, Indianapolis, Ind.
[73] Assignee: General Motors Corporation, Detroit, Mich.
[22] Filed: Nov. 19, 1973
[21] Appl. No.: 417,257

[52] U.S. Cl. ............... 60/223; 60/39.23; 60/39.25; 60/39.27; 60/39.28; 60/39.29
[51] Int. Cl. ..................... F02k 11/00; F02c 9/02
[58] Field of Search ........ 60/39.28 R, 39.28 T, 223, 60/39.25, 39.27, 39.29, 39.23

[56] References Cited
UNITED STATES PATENTS

| | | | |
|---|---|---|---|
| 2,880,580 | 4/1959 | Wallace | 60/39.28 T |
| 3,078,670 | 2/1963 | Werner | 60/39.28 R |
| 3,390,522 | 7/1968 | Whitehead | 60/39.28 R |
| 3,514,948 | 6/1970 | Warne | 60/39.28 R |
| 3,623,326 | 11/1971 | Greune | 60/39.28 T |
| 3,777,480 | 12/1973 | Stoltman | 60/39.28 R |

*Primary Examiner*—Clarence R. Gordon
*Attorney, Agent, or Firm*—Paul Fitzpatrick

[57] ABSTRACT

A control for a gas turbine engine includes a fuel metering valve operated directly by the vehicle operator and a metering head regulating valve controlled electronically in response to engine operating parameters; also variable geometry means in the engine to accommodate to varying airflow and power levels which are actuated by a servomechanism controlled by the position of the vehicle operator's power control. In the event of failure of the electronic controls, the metering head drops to a value which is safe at any throttle opening but sufficient to run the engine.

5 Claims, 1 Drawing Figure

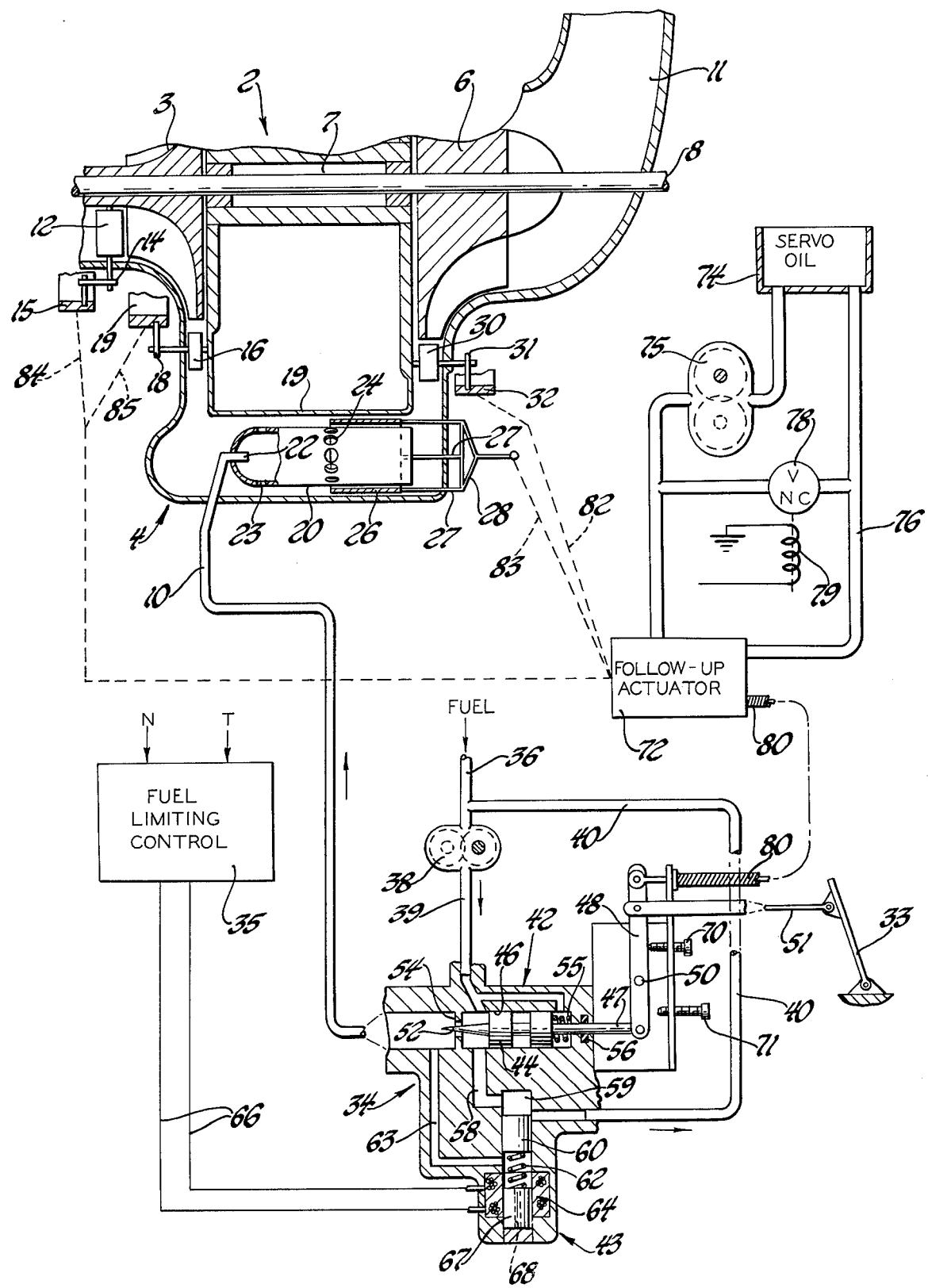

GAS TURBINE ENGINE CONTROL

My invention is directed to controls for gas turbine engines, and in particular to simple controls suitable for low cost production and thus well adapted for such uses as automotive power plants.

A great variety of controls for gas turbine engines have been proposed and many have been produced and used. Many of these controls are not suited for such applications as automotive power plants where cost must not be excessive.

One approach to cost reduction in gas turbine controls has been development of electronic controls which respond to the operator's power demand and to various parameters such as ambient air temperature, engine rpm, temperature in the engine, etc., to control fuel for proper and safe operation of the engine. Typically in such controls, the flow of fuel to the engine is controlled directly or indirectly by a valve which responds to an electrical signal, such as a current level or duty cycle signal, generated by the electronic control. This, of course, requires an input from the operator control to the electronic control system and causes the fuel metering valve to be driven only through the electronic control.

It has occurred to me that simplification and improvement of gas turbine controls may be effected by operating the fuel metering valve directly from the operator's control, such as the common vehicle accelerator pedal, and relying upon the electronic controls to provide a limiting function to prevent overspeed or overtemperature of the engine, for example. This may be done by having the electronic control modulate the pressure drop across the metering valve. The flow of fuel to the engine is closely proportional to the product of the area of the metering valve and the square root of the pressure drop across the valve.

In implementing this concept, I employ the electronic controls in such fashion as to increase the pressure drop or metering head from a predetermined minimum value up to a limiting value, the amount of increase being limited by the response of the electronic control to such limiting parameters as engine speed and temperature. The minimum value is set at a point that will prevent overfueling at open throttle but will allow operation of the engine. Thus, if no signal is received from the electronic control, the engine may be operated at a low power level at larger openings of the throttling valve.

In many applications of gas turbine engines, it is considered highly desirable to provide what may be termed variable geometry of the engine for greater efficiency and improved response at various power output levels and under various conditions of operation. Such variable geometry ordinarily may include variable inlet guide vanes for the engine compressor, variable outlet guide vanes for the engine compressor, variable geometry in the combustion apparatus to vary the ratio between combustion and dilution air, and variable turbine nozzle vanes.

Preferably, in accordance with my invention, these are controlled directly by the vehicle operator apart from the electronic control. Since considerable effort may be required to change the position of the various geometry elements, in most cases it will be expedient, if not necessary, to provide a power actuator such as a position servomotor of any suitable type which operates the variable geometry elements according to predetermined schedules with relation to the engine power demand signal.

The principal objects of my invention are to provide improved controls for gas turbine engines, to provide controls which are simple and economical to manufacture, to provide a gas turbine engine control in which the fuel is metered by a valve operated directly by the vehicle operator and in which flow of fuel is trimmed by an electrical apparatus responsive to engine operating conditions, and to provide a favorable integration of fuel controls and variable geometry controls for a gas turbine engine.

The nature of my invention and its advantages will be more clearly apparent to those skilled in the art from the succeeding detailed description of the preferred embodiment of the invention and the accompanying drawing thereof.

The FIGURE is a schematic diagram of a gas turbine engine and a control system for it.

Referring to the drawing, it illustrates schematically a gas turbine engine 2 comprising the usual basic elements of a compressor 3, combustion apparatus 4 supplied by the compressor, and a turbine 6 energized by the combustion products generated in the combustion apparatus. As illustrated, the compressor and turbine are radial-flow types. The turbine 6 drives the compressor 3 through a shaft 7 and also drives a power output shaft 8 which is a continuation of shaft 7. The engine as illustrated is of a single-shaft type although, so far as my control is concerned, the shaft 8 might be driven by a low pressure turbine energized by the exhaust from the compressor-driving turbine 6. Engines of this general nature are well known and no detailed description is required. We may mention, however, that the rotating compressor delivers air at increased pressure to the combustion apparatus 4 to which fuel is supplied through a fuel line 10. The combustion products flow from the combustion apparatus through the turbine 6 and into an exhaust duct 11. If desired, the air flowing to the combustion apparatus may be heated by heat exchange with the exhaust gases, as is well known. Engines of this general nature are described in some detail in U.S. patents of Amann U.S. Pat. No. 2,820,341, Jan. 21, 1958; Collman et al. U.S. Pat. No. 3,077,074, Feb. 12, 1963; and Collman et al. U.S. Pat. No. 3,267,674, Aug. 21, 1966.

The drawing also illustrates schematically elements of variable geometry in the engine to accommodate it to various operating conditions so as to improve fuel economy and acceleration. As illustrated, a ring of variable setting inlet guide vanes 12 is disposed in the inlet to the compressor. Each vane may be mounted on a shaft which is coupled by an actuating arm 14 to an operating ring or unison ring 15. Such structures may be similar to those described in U.S. Pat. Nos. 2,857,092 to Campbell, Oct. 21, 1958, and 3,303,992 to Johnson, Feb. 14, 1967. They will not be described in detail here.

The compressor includes a ring of variable diffuser vanes 16 which diffuse the flow from the compressor, and which may be termed compressor outlet variable geometry. Each of these vanes may, for example, be mounted as illustrated on a shaft coupled through an actuating arm 18 to an operating ring or unison ring 19 rotatable about the axis of shaft 7. Other forms of variable outlet geometry may be used, if desired.

The combustion apparatus 4 may include an outer casing 19 and a combustion liner or flame tube 20. Fuel is sprayed through a nozzle 22 supplied by the fuel line 10 and combustion takes place within the liner 20. Primary air; that is, air for combustion, may enter the liner through ports 23 and secondary or dilution air may enter through variable ports 24. The area for flow of air through ports 24 may be varied by a valve sleeve 26 slidably mounted on the exterior of the combustion liner and coupled to a number of push rods 27 extending through the end of combustion chamber casing 19 to a yoke 28. By reciprocating the sleeve 26, the ratio of dilution air to combustion air may be varied as a function of the engine power level called for by the engine power control to be described. Any suitable means for varying the airflow may be used, including that shown in Seippel U.S. Pat. No. 2,249,489, July 15, 1941.

The combustion products are discharged from the downstream end of the liner into a turbine nozzle including an annular cascade of variable setting vanes 30. Each of these vanes may be mounted on a shaft and coupled by an arm 31 fixed to the shaft to an operating ring or unison ring 32 to vary the nozzle area by changing the setting of the vanes. Such a structure might be as described in Egli U.S. Pat. No. 2,860,827, Nov. 18, 1958.

The means for actuation of the variable geometry devices will be passed over for the present.

Considering now the control of engine fuel, this is effected in response to actuation of a power control 33 which, as illustrated, is specifically a hinged foot throttle or accelerator pedal of known type. The power control 33 is coupled through suitable linkage to a fuel regulating valve assembly 34. This operates under control of the power control 33 and a fuel limiting control system 35. The fuel limiting control in the preferred embodiment is specifically an electronic control system which responds to engine parameters to prevent such undesirable occurrences as over-temperature or over-speed of the engine. As illustrated schematically, the control 35 responds to an input N of engine or compressor speed and an input T of temperature in the engine which may, for example, be turbine inlet temperature. Other limiting parameters might be included; for example, a power turbine speed input if there is a separate power turbine.

As is usual with gas turbine engines, the fuel is supplied through a line 36 from a source such as a vehicle fuel tank and boost pump to a high pressure fuel pump 38 which may be driven by shaft 7 through suitable gearing. The pump delivers the fuel through a fuel line 39 to the valve assembly 34 which delivers metered fuel through the line 10 to the combustion apparatus 4. Fuel discharged by the pump in excess of that required by the engine is returned through a by-pass or return line 40 to the inlet of pump 38.

The regulating valve assembly 34 includes a throttling metering valve 42 and a metering head regulating valve 43. The former is moved to vary the area for flow of fuel and the latter variably regulates the pressure drop or head across the metering valve 42.

The throttling valve 42 includes a piston 44 guided in a cylinder 46 and actuated by a rod 47. Rod 47 is coupled by a rocker arm 48, pivoted at 50 on a part of the valve assembly structure, and a link 51 to the pedal 33. The piston bears a valve needle 52 which cooperates with a seat 54 to define a variable orifice between the cylinder 42 and the outlet line 10. Pump outlet line 39 enters the cylinder 46 between the piston and the seat, and a branch of the pump outlet line enters the opposite end of the cylinder to balance the hydraulic forces on the valve piston. A coil compression spring 55 provides some force biasing the throttling valve toward its closed position. Stem 47 may be sealed by an O-ring 56. Fuel line 39 is also coupled through a connection 58 to the cylinder 59 of head regulating valve 43. A valve piston 60 slidable in cylinder 59 opposes flow from the connection 58 into a port leading to the by-pass line 40. The piston is biased to close the by-pass line by a coil compression spring 62. It is also biased to close by the pressure of metered fuel downstream of valve 42, which is conducted to the opposite face of piston 60 through a conduit 63. The metering head or pressure drop across the metering valve is thus a direct function of the force exerted on piston 60 by spring 62.

The metering head is varied by varying the force exerted by spring 62 on valve piston 60 through the action of a solenoid 64 energized through leads 66 from the fuel limiting control 35. Solenoid 64 exerts a variable force on a reciprocable armature 67, which tends to move upwardly as illustrated when the coil is energized to increase the tension on spring 62. The rear face of armature 67 is exposed to the same pressure as the forward face through a passage 68 along the axis of the armature. The function of the solenoid is to prevent overspeed and overtemperature of the engine. This is accomplished by providing an output through leads 66 which is at a maximum value, increasing the metering head to its maximum value, as long as engine operating limits are not too closely approached. However, if either speed or temperature becomes excessive, the current is reduced, decreasing the force exerted by the armature through spring 62 on the piston 60. Thus the pressure drop through the metering valve and fuel flow are decreased. The amount of current fed to the armature is limited by the inputs of speed and temperature so that when either speed or temperature reaches the predetermined limiting value, current to the solenoid is reduced to hold the limiting parameter at its desired maximum value. Circuits suitable for such purposes are known and details are immaterial. One example is described in McCauley U.S. Pat. No. 3,546,598, Dec. 8, 1970.

If the electronic control should become deenergized or have some other failure such that there is no longer any energization of coil 64, armature 67 would be forced to the minimum pressure position as illustrated by spring 62. In this case, the metering head reaches a predetermined minimum value determined by the constants of spring 62. This value is selected so that, even with the metering valve wide open, there is insufficient fuel to harm the engine. On the other hand, there is sufficient fuel to operate the engine at a relatively low power rating so that a vehicle could be driven under such circumstances, notwithstanding the casualty to the electronic control.

It may be noted that maximum and minimum area limits for the throttling valve are provided by limit stop screws 70 and 71.

Operation of the variable geometry of the engine in response to position of the power control 33 is effected through a follow-up actuator or position servomotor 72 which may be of any suitable type. Preferably, it is a hydraulic actuator in which an output member is powered to follow the movements of an input member which does not provide the force to actuate the load. Such devices are well known and details need not be described.

The actuator 72 is supplied with suitable energizing fluid such as servo oil from a reservoir 74 by a pump 75 which may be driven by the turbine 6, and is returned from the actuator to the reservoir through a line 76. A normally closed solenoid operated valve 78 may be provided to disable the actuator. When the solenoid 79 is energized, valve 78 is opened so that the actuator is by-passed. This may be desirable during starting of the engine so that the engine variable geometry is not actuated during starting but returns to a datum position.

The actuator 72 may, as usual, comprise a piston operated reversibly by the oil supplied by pump 75 through control by a valve which comprises a member actuated from the power control 33 and a member which travels with the piston of the actuator. The input to the actuator may be provided by a push-pull cable 80 connected to the rocker arm 48.

The actuator piston or other output member is connected through suitable linkage indicated by the broken lines 82, 83, 84, and 85 to the turbine nozzle vanes, the combustion chamber geometry, the compressor inlet guide vanes, and the compressor outlet vanes. The geometric characteristics of the linkages are such as to give the desired relation between the position of the several variable geometry elements and the power level input transmitted by the control 33. The exact schedule for each of these is a matter of design for any particular engine, having regard to the characteristics of the engine and the load to which it is connected.

It should be apparent to those skilled in the art from the foregoing description that my control system provides a simple and effective apparatus for control of an engine particularly suited for such installations as automotive vehicles. It will be understood that the variable geometry of the engine may not include all of the elements described and may include other devices; but whatever variable geometry is desired may be actuated in the manner described by the power control 33 and suitable linkage, ordinarily including a position servo such as 72.

The detailed description of the preferred embodiment of the invention for the purpose of explaining the principles thereof is not to be considered as limiting or restricting the invention, since many modifications may be made by the exercise of skill in the art.

I claim:

1. A control system for a gas turbine engine having as controlling inputs an operator-operable power control and limiting inputs such as from engine speed responsive means and from engine temperature responsive means; the system comprising, in combination, a throttling valve for controlling fuel flow to the engine operated directly by the power control so that the flow area of the throttling valve is substantially a single-valued function of power control position, a head regulating valve controlling the pressure head across the throttling valve, and fuel limiting control means for controlling the head regulating valve normally effective to vary the said pressure head in response to such limiting inputs, the fuel limiting control means being effective to regulate the head so as not to exceed a maximum value allowable for safe engine operation as determined by the said limiting inputs, and being effective to cause the head to drop to a value insufficient to overfuel the engine with the throttling valve fully open in the event of failure of the head regulating valve controlling means.

2. A control system for a gas turbine engine having as controlling inputs an operator-operable power control and limiting inputs from engine speed responsive means and from engine temperature responsive means; the system comprising, in combination, a throttling valve for controlling fuel flow to the engine operated directly by the power control so that the flow area of the throttling valve is substantially a single-valued function of power control position, a head regulating valve controlling the pressure head across the throttling valve, and fuel limiting control means for controlling the head regulating valve normally effective to vary the said pressure head in response to the said limiting inputs, the fuel limiting control means being effective to regulate the head so as not to exceed a maximum value allowable for safe engine operation as determined by the said limiting inputs, and being effective to cause the head to drop to a value insufficient to overfuel the engine with the throttling valve fully open in the event of failure of the head regulating valve controlling means.

3. A control system for a gas turbine engine having operating controls for variable engine geometry; and having as controlling inputs operator-operable power control and limiting inputs such as from engine condition responsive means; the system comprising, in combination, a throttling valve for controlling fuel flow to the engine operated directly by the power control so that the flow area of the throttling valve is substantially a single-valued function of power control position, a head regulating valve controlling the pressure head across the throttling valve, fuel limiting control means for controlling the head regulating valve normally effective to vary the said pressure head in response to the said limiting inputs, the fuel limiting control means being effective to regulate the head so as not to exceed a maximum value allowable for safe engine operation as determined by the said limiting inputs, and being effective to cause the head to drop to a value insufficient to overfuel the engine with the throttling valve fully open in the event of failure of the head regulating valve controlling means; and servomechanism responsive to the power control connected to set the said operating controls as scheduled by the power control.

4. A control system for a gas turbine engine having operating controls such as variable compressor geometry, variable combustion apparatus geometry, and variable turbine geometry; and having as controlling inputs an operator-operable power control and limiting inputs such as from engine speed responsive means and from engine temperature responsive means; the system comprising, in combination, a throttling valve for controlling fuel flow to the engine operated directly by the power control so that the flow area of the throttling valve is substantially a single-valued function of power control position, a head regulating valve controlling the pressure head across the throttling valve, fuel limiting control means for controlling the head regulating valve normally effective to vary the said pressure head in response to such limiting inputs, the fuel limiting control means being effective to regulate the head so as not to exceed a maximum value allowable for safe engine operation as determined by the said limiting inputs, and being effective to cause the head to drop to a value insufficient to overfuel the engine with the throttling valve fully open in the event of failure of the head regulating valve controlling means; and servomechanism responsive to the power control connected to set the said operating controls as scheduled by the power control.

5. A control system for a gas turbine engine having as operating controls a variable compressor inlet configuration, a variable compressor outlet configuration, variable combustion apparatus air distribution control means, and a variable turbine inlet; and having as controlling inputs an operator-operable power control and inputs of engine speed and engine temperature; the system comprising, in combination, a throttling valve for controlling fuel flow to the engine operated directly by the power control so that the flow area at the throttling valve is substantially a single-valued function of power control position, head regulating valve means controlling the pressure head across the throttling valve, means for controlling the head regulating valve means normally effective to vary the said pressure head in response to the said inputs of speed and temperature, the valve controlling means being effective to cause the head to drop to a value insufficient to overfuel the engine with the throttling valve fully open in the event of failure of the head regulating valve controlling means; and servomechanism responsive to the power control connected to set the said operating controls as scheduled by the power control.

* * * * *